United States Patent [19]
Doerr

[11] Patent Number: 6,049,640
[45] Date of Patent: Apr. 11, 2000

[54] WAVELENGTH-DIVISION-MULTIPLEXING CROSS-CONNECT USING ANGULAR DISPERSIVE ELEMENTS AND PHASE SHIFTERS

[75] Inventor: Christopher Richard Doerr, Atlantic Highlands, N.J.

[73] Assignee: Lucent Technologies Inc., Murray Hill, N.J.

[21] Appl. No.: 08/923,304

[22] Filed: Sep. 4, 1997

[51] Int. Cl.[7] .................................................. G02B 6/42
[52] U.S. Cl. ............................... 385/15; 385/37; 385/46; 385/24
[58] Field of Search ................................. 385/15–24, 37, 385/46

[56] References Cited

U.S. PATENT DOCUMENTS

| | | | |
|---|---|---|---|
| 5,706,377 | 1/1998 | Li ................................................ | 385/37 |
| 5,841,919 | 11/1998 | Akiba et al. ............................... | 385/37 |
| 5,913,000 | 6/1999 | Doerr et al. ............................... | 385/46 |

OTHER PUBLICATIONS

K. Okamoto, et al, "16–channel optical add/drop multiplexer consisting of arrayed–waveguide gratings and double–gate switches", Elec. Letters, vol. 32, Aug. 1, 1996, pp. 1471–147291.

C. G. M. Vreeburg, et al, "First InP–Based Reconfigurable Intergrated Add–Drop Multiplexer", IEEE Photonics Tech. Letters, vol. 9, No. 2, Feb. 1997, pp. 188–190.

B. Glance, "Tunable Add/Drop Optical Filter Providing Arbitrary Channel Arrangements", IEEE Photonics Tech. Letters, vol. 7, No. 11, Nov. 1995, pp. 1303–1305.

*Primary Examiner*—Phan T. H. Palmer

[57] ABSTRACT

A Wavelength-Division-Multiplexer (WDM) cross-connect is implemented using two connected units of angular dispersive elements, with non-zero relative phase shifts between the elements, which are interconnected using controllable phase shifters. Another embodiment uses two "interleave-chirped" waveguide grating routers connected by waveguides with phase shifters. The phase shifters can be selectively controlled enabling the WDM to be reconfigureable. Yet another embodiment recognizes the symmetrical property of the WDM cross-connect and uses a reflector unit to replace one half of the WDM cross-connect.

36 Claims, 9 Drawing Sheets

TABLE 1

| P | ARM LENGTH CHANGE SERIES $[\lambda_c]$ |
|---|---|
| 2 | $\frac{1}{4}, 0$ |
| 3 | $\frac{1}{3}, 0, 0$ |
| 4 | $\frac{1}{2}, 0, 0, 0$ |
| 5 | $\frac{1}{5}, \frac{3}{5}, \frac{1}{5}, 0, 0$ |
| 6 | $\frac{3}{4}, \frac{1}{3}, \frac{3}{4}, 0, \frac{1}{12}, 0$ |
| 7 | $\frac{1}{7}, \frac{3}{7}, \frac{6}{7}, \frac{3}{7}, \frac{1}{7}, 0, 0$ |
| 8 | $\frac{1}{4}, \frac{1}{2}, 0, \frac{1}{2}, \frac{1}{4}, 0, 0, 0$ |

WAVELENGTH-DIVISION-MULTIPLEXING CROSS-CONNECT USING ANGULAR DISPERSIVE ELEMENTS AND PHASE SHIFTERS

TECHNICAL FIELD OF THE INVENTION

This invention relates to Wavelength-Division-Multiplexers (WDMs) and, more particularly, to a WDM cross-connect implemented using angular dispersive elements and phase shifters.

BACKGROUND OF THE INVENTION

A Wavelength-Division-Multiplexing (WDM) cross-connect (a non-wavelength-changing one) is a device that can exchange any wavelength channel in any line with the same wavelength channel in any other line. The conventional design is to use a matrix of switches between sets of wavelength multiplexers, such as Waveguide Grating Routers (WGRs). For example see the publications

[1] M. K. Smit, "New focusing and dispersive planar component based on an optical phased array," Electron. Lett., vol. 24, pp. 385–386 (1988);

[2] H. Takahashi, S. Suzuki, K. Kato and I. Nishi, "Arrayed-waveguide grating for wavelength division multi/demultiplexer with nanometer resolution," Electron. Lett., vol. 26, pp. 87–88 (1990); and

[3] C. Dragone, "An N×N optical multiplexer using a planar arrangement of two star couplers," IEEE Photon. Technol. Lett., vol. 3, 812–814 (1991).

For 2 line×2 line versions, designs have been demonstrated with discrete components {e.g., see B. Glance, "Tunable add drop optical filter providing arbitrary channel arrangements," IEEE Photon. Technol. Lett., vol. 7, 1303–1305 (1995)} and with fully integrated components {e.g., see K. Okamoto, M. Okuno, A. Himeno, and Y. Ohmori, "16-channel optical add/drop multiplexer consisting of arrayed-waveguide gratings and double-gate switches," Electron. Lett., vol. 32, 1471–1472 (1996)}.

Notwithstanding these advances in the design of WDMs, there is a continuing need to integrate the switch and WGR functions and to further reduce the size of WDMs.

SUMMARY OF THE INVENTION

In accordance with the present invention, a Wavelength-Division-Multiplexer (WDM) cross-connect is implemented using two connected units of angular dispersive elements with non-zero relative phase shifts between the elements which are interconnected using controllable phase shifters. Another embodiment uses two "interleave-chirped" waveguide grating routers connected by waveguides with phase shifters. The phase shifters can be selectively controlled enabling the WDM to be reconfigureable. Yet another embodiment recognizes the symmetrical property of the WDM cross-connect and uses a reflector unit to replace one half of the WDM cross-connect.

More particularly the first embodiment of a Wavelength Division Multiplexing (WDM) cross-connect comprises a first unit comprising 2 or more angular dispersive elements that have a non-zero phase shift between them that couple somewhat equally to one or more input ports, a second unit comprising 2 or more angular dispersive elements that have a non-zero phase shift between them that couple somewhat equally to one or more output ports, and a phase shifter unit that carries the images from the dispersive elements of the first unit to the images of the same frequency from the dispersive elements of the second unit and can control the relative phases between the images for the purpose of directing signals from selected input ports in the first unit to selected output ports in the second unit.

According to a more particularly second embodiment, a WDM cross-connect comprises a first waveguide grating router (WGR) for receiving multiple wavelength optical signals at least two input ports, a phase shifter unit, and a second WGR for outputting multiple wavelength optical signals at least two output ports. The first and second WGRs each including a first coupler, an interconnect unit and a second coupler. The interconnect unit of the first WGR includes a plurality of interleaved chirped waveguide paths for enabling the first WGR to provide multiple images of any optical wavelength received at the WGR inputs. The phase shifter unit including multiple waveguides for interconnecting the first WGR to the second WGR and for providing an associated phase shift to multiple images passing therethrough. The phase shifter waveguides can be selectively controlled enabling the WDM to be reconfigureable. The second WGR receives the multiple images from the phase shifter unit and combines them into two multiple wavelength optical signals for output at least two output ports.

According to a more particular third embodiment, I have recognized the symmetry of the above-described second embodiment of the WDM cross-connect and have replaced half of the WDM cross-connect with a reflector unit. The reflector unit reflects the received multiple images back to the WGR which combines them into two multiple wavelength optical signals for output via the input ports. Input/output couplers are connected to the input ports to enable them to couple both signals to and output signals from the input ports of the WDM cross-connect.

DETAILED DESCRIPTION

In the following description, each item or block of each figure has a reference designation associated therewith, the first number of which refers to the figure in which that item is first located (e.g., 110 is first located in FIG. 1).

Figure 1:
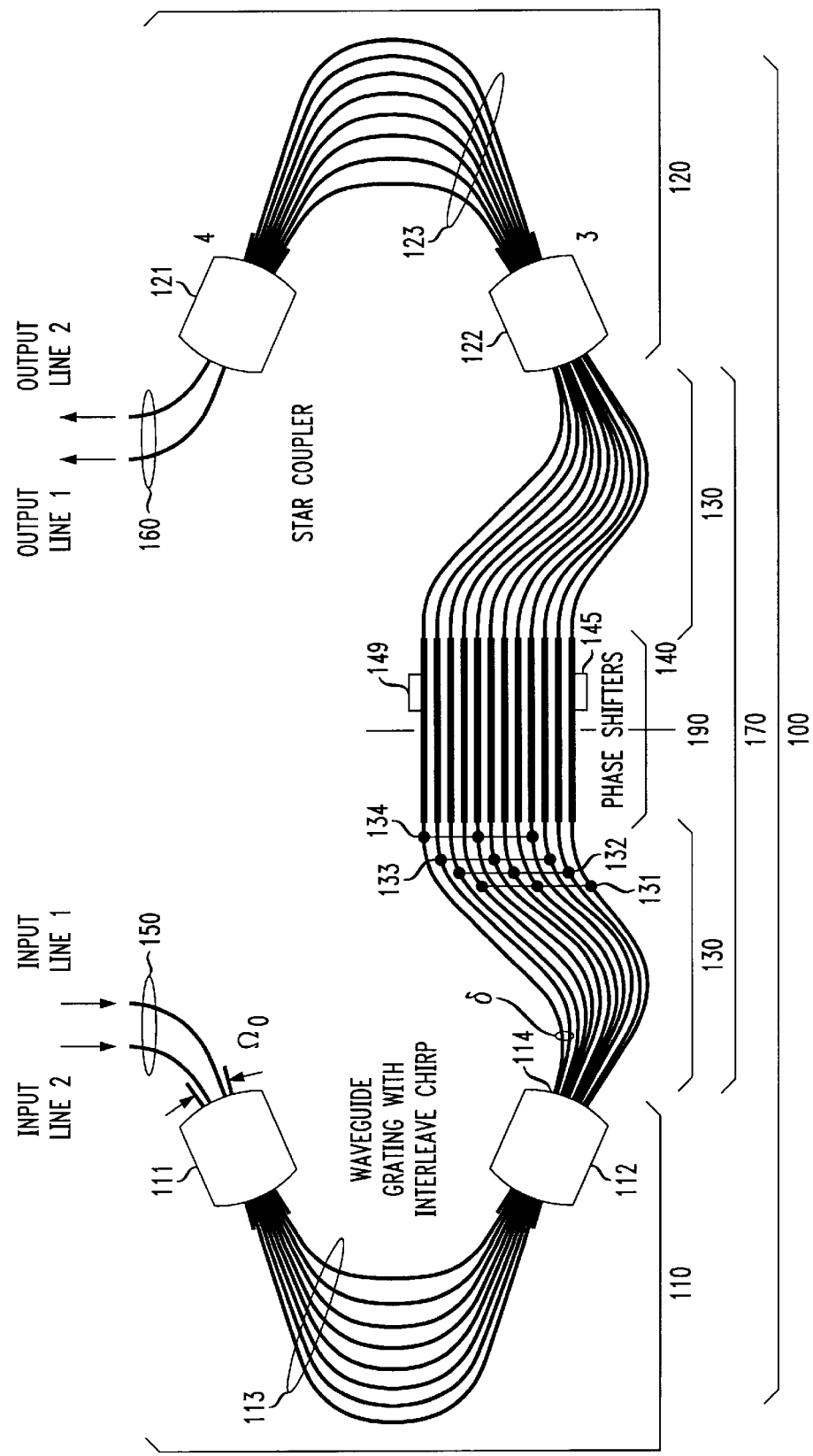
FIG. 1 shows an illustrative diagram of a reconfigureable wavelength-division-multiplexing (WDM) cross-connect comprising two "interleave-chirped" waveguide grating routers (WGRs) connected by a phase shifter unit.

Shown in FIG. 1 is an illustrative diagram of a reconfigureable wavelength-division-multiplexing (WDM) cross-connect 100 comprising two "interleave-chirped" waveguide grating routers (WGRs) 110 and 120 connected by a phase shifter unit 170 which includes a waveguide arrays 130 and 130' and a phase shifter array 140. The WDM cross-connect 100 can be monolithically integrated with no waveguide crossings and theoretically can achieve very high switching extinction ratios and a nearly excess-loss-free rectangular spectral response.

A plurality of optical lines, e.g., lines 1 and 2, may be connected as the input lines (or input ports) 150 and output lines (or output ports) 160 of WDM cross-connect 100. Each of the lines 1 and 2 may carry a plurality of wavelength channels. For the 2 line×2 line case shown in FIG. 1, any wavelength channel in one line. e.g., line 1, can be exchanged with the same wavelength channel in the other line, i.e., line 2. For the more general P line×P line case, where P=2, the channels can be switched in a cyclical fashion between lines. The WDM cross-connect 100 can be implemented as a compact device with no waveguide crossings; can theoretically achieve very high, fabrication-tolerant, switching extinction ratios; and can theoretically achieve a nearly excess-loss-free rectangular spectral response.

Each of the two "interleave-chirped" WGRs 110 and 120 are formed from two star couplers, e.g., 111 and 112, connected by an array of grating arms, e.g., 113. Such WGRs may be of the type described in U.S. Pat. No. 5,136,671, issued to C. Dragone on Aug. 4, 1992 or the above-identified Dragone article, both of which are incorporated by reference herein.

For any multiple wavelength signal received over each the input lines 1 and 2, the operation of WGR 110 causes all signal wavelengths which are the same to be directed to the same output waveguide of arrays 130 and 130'. Consequently, each of the different wavelengths of input line 1 is received in free space region 114 and directed, according to wavelength, to a particular group of one or more of the waveguides of arrays 130 and 130'. Similarly, each of the different wavelengths of input line 2 (if spaced within the same Brillouin zones $\Omega_0$ as input line 1) is received in free space region 114 and directed, according to wavelength, to a particular group of one or more of the waveguides of arrays 130 and 130'. Thus in FIG. 1, if we assume that the signal on line 1 includes four wavelength channels $\lambda 1$, $\lambda 2$, $\lambda 3$, and $\lambda 4$ each of the wavelengths would be directed to a different group of waveguides 131, 132, 133, and 134, respectively, of array 130.

In accordance with the present invention, for P=2 input and output lines (lines 1 and 2) the WGR 110 (and 120) are provided with an "interleave chirp" which consists of giving every other grating arm of array 113 (and 123) an additional path length of $\lambda_c/4$, where $\lambda_c$ is the wavelength of interest in the waveguide ($\lambda_c = \lambda_{c0}/n$). The additional path length of $\lambda_c/4$ produces a delay or phase shift of $\pi/2$, or 90° degrees. The radiation patterns from the arrays of waveguide grating arms, e.g., 113, in the star couplers 111 and 112 of WGR 110 have Brillouin zones $\Omega_i$ of order i and width $2\gamma$ [e.g., see the article by C. Dragone, "Optimum design of a planar array of tapered waveguides," J. Opt. Soc. Am. A, vol. 7, pp. 2081–2091 (1990)]. The interleave chirp makes the WGRs create two images for each wavelength in each $\Omega_i$, the images spaced by $\gamma$. This can be understood from the following: consider a non-chirped WGR. Single-wavelength (or frequency) signals entering an input port, e.g., input line 1, in one star coupler 111 of the WGR 110 are imaged to $\Omega_0$ in the free space region 114 of the other star coupler, i.e., 112.

Figure 2:
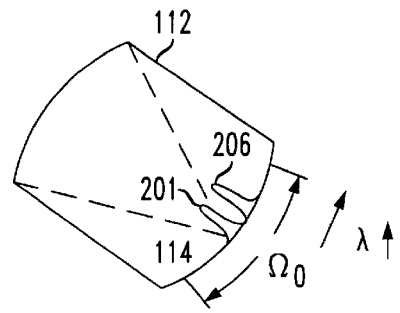
FIG. 2 shows an illustrative image being focused in a Brillouin zone $\Omega_0$ of the free space region of a star coupler of a standard WGR.

With reference to FIG. 2, there is shown a $\lambda 1$ signal image 201 being focused in Brillouin zone $\Omega_0$ of the free space region 114 of star coupler 112 of a standard "non-chirped" WGR. While in our example the image was derived for a $\lambda 1$ signal received on input line 1, a $\lambda 1$ signal received over input line 2 would generate the same image 206. It should also be noted that a longer wavelength $\lambda 2$ entering line 1 would produce the image 206 in Brillouin zone $\Omega_0$. To better understand how the image 201 is formed, we consider FIGS. 3 and 4.

Figure 3:
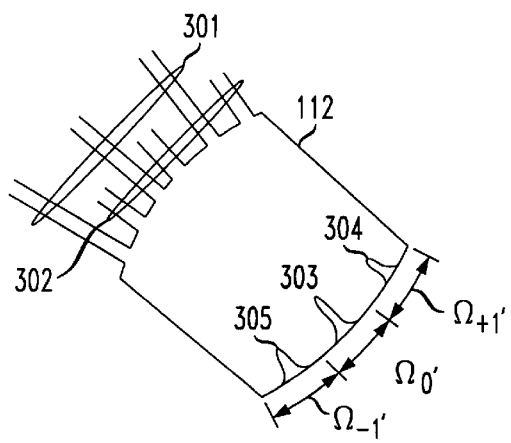
FIG. 3 shows the images from input line 1 at a free space region of a star coupler when all the even-numbered grating arms remain and the odd-numbered grating arms are removed.

Shown in FIG. 3 is a star coupler 112 where all of the even-numbered grating arms 301 to star coupler 112 remain and the odd-numbered grating arms 302 are removed. In such a modified coupler, the new Brillouin zones $\Omega_0'$, $\Omega_{+1}'$ and $\Omega_{-1}'$ are half the size of those of FIG. 2, and there is an image 303, 304, and 305, respectively, in each $\Omega_0'$, $\Omega_{+1}'$ and $\Omega_{-1}'$, and all of the images have the same phase.

Figure 4:
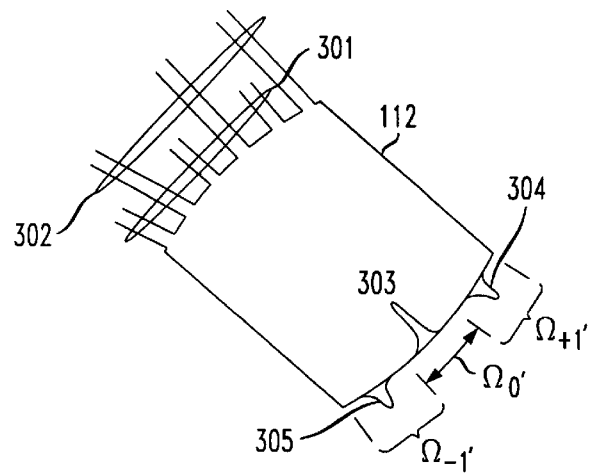
FIG. 4 shows the images from input line 1 at a free space region of a star coupler when all the odd-numbered grating arms remain and the even-numbered grating arms are removed.

Shown in FIG. 4 is the effect of pufting-back the odd-numbered arms 302 and removing the even-numbered arms 301. The same Brillouin zones $\Omega_0'$, $\Omega_{+1}'$ and $\Omega_{-1}'$ and same images 303, 304, and 305 result, except that the images in the odd-order Brillouin zones $\Omega_{+1}'$ and $\Omega_{-1}'$ are 180° out of phase.

It should be noted that when all the grating arms 301 and 302 are present, i.e., the FIG. 2 case, the images from the even- and odd-numbered arms add constructively in the even-order Brillouin zones $\Omega_i'$ (i.e., $\Omega_0'$), and destructively in the odd Brillouin zones $\Omega_i'$ (i.e., $\Omega_{+1}'$ and $\Omega_{-1}'$), resulting in only one image in each of the even-order Brillouin zones $\Omega_i$ (i.e., $\Omega_0'$). With reference to FIG. 2 again, the resulting image is shown as image 201 in Brillouin zone $\Omega_0$.

Figure 5:
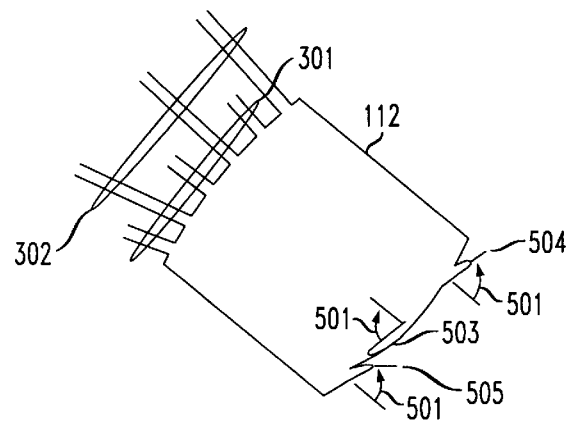
FIG. 5 shows the images from input line 1 at a free space region of a star coupler when all the odd-numbered grating arms are lengthened to include an additional 90° phase rotation and the even-numbered grating arms are removed.
Figure 6:
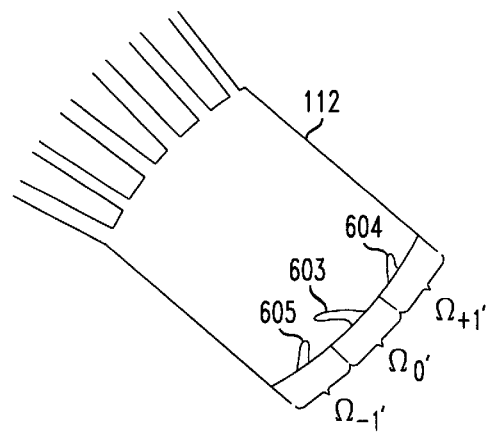
FIG. 6 shows the combined images from FIG. 3 and FIG. 5 at the free space region of a star coupler when all the odd-numbered grating arms are lengthened to include an additional 90° phase rotation.

With reference to FIG. 5, in accordance with the present invention, when an "interleave chirp" is added to the odd-order grating arms 302, the phasors of the odd-order grating arms 302 are phase shifted or rotated by $\pi/2$. As shown in FIG. 5, the resulting images in the Brillouin zones $\Omega_i'$ (i.e. $\Omega_0'$, $\Omega_{+1}'$ and $\Omega_{-1}'$) are counter-clockwise rotated by $\pi/2$ (90 degrees) 501, as shown by the images 503, 504, and 505. Consequently, when a WGR 112 is formed having all of its grating arms 302 connected as shown in FIG. 6, its images 603, 604, and 605 are formed by combining the images 503, 504, and 505 of FIG. 5 with the images 303, 304, and 305 of FIG. 3. Note that when the images 504 and 505 of the odd-order Brillouin zones of FIG. 5 are combined with the odd-order images 304 and 305 of FIG. 3, they no longer cancel, resulting in the images 603 and 604 in the odd $\Omega_i$ of FIG. 6. As in the standard, non-chirped WGR of FIG. 2, most of the power is in $\Omega_0'$. Also, the WGR free-spectral range is reduced by a factor of two over the standard, non-chirped WGR.

Figure 7A:
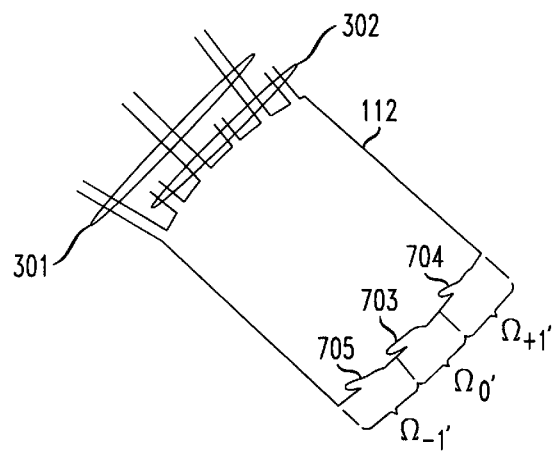
FIG. 7a shows the images from input line 2 at a free space region of a star coupler when all the odd-numbered grating arms are lengthened to include an additional 90° phase rotation and the even-numbered grating arms are removed.
Figure 7B:
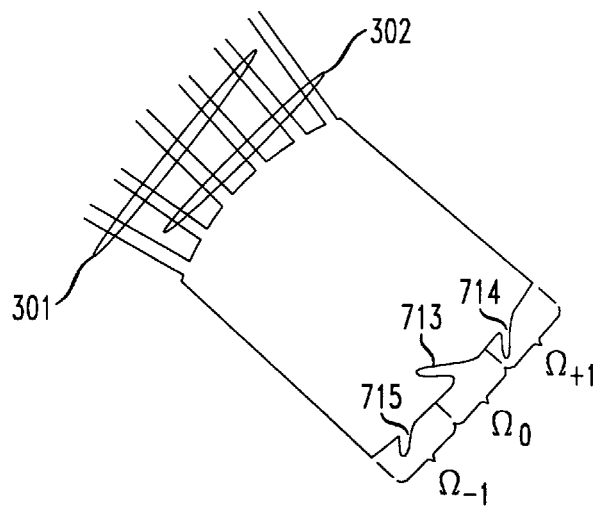
FIG. 7b shows the combined images from FIG. 4 and FIG. 7a at the free space region of a star coupler when all the odd-numbered grating arms are lengthened to include an additional 90° phase rotation.

As previously noted, if the same single-wavelength signal enters an input port associated with input line 2, which is spaced by the width of one W' from the input port associated with line 1 in star coupler 111, it would also be imaged to $\Omega_0'$ in the free space region 114 of star coupler 112. In this example, however, it is the images of FIG. 3 that are rotated and those of FIG. 4 remain the same. The 90 degree rotated images of FIG. 3 are shown in FIG. 7a, by the images 703, 704 and 705 (in $\Omega_0'$, $\Omega_{+1}'$ and $\Omega_{-1}'$). Consequently, as shown in FIG. 7b, when a WGR 112 is formed having all of its grating arms 302 connected, the rotated images 703, 704 and 705 of FIG. 7a are combined with images 403, 404 and 405 of FIG. 4 to form the images 713, 714 and 715 (in $\Omega_0'$, $\Omega_{+1}'$ and $\Omega_{-1}'$). With joint reference to FIGS. 6 and 7b, note that the images 603 and 713 are the same, but the images 714 and 715 are 1800 rotated from the images 604 and 605.

Returning to FIG. 1, the images out of WGR 112 are collected by the equal-length waveguides of array 130. Generally only images from $\Omega_0'$, $\Omega_{+1}'$ and $\Omega_{-1}'$ are connected since they contain almost all the image power. To better show the waveguide sets in FIG. 1, the WGR free-spectral range is 5 channel widths, with the 5th channel unconnected, as one can see from the gaps in the waveguide spacings. Thus, there are three output waveguides, each spaced by $\gamma$, for each wavelength channel 131–134 exiting coupler 112 of WGR 110 and entering coupler 122 of WGR 120. Thus as shown in FIG. 1, each of the groups of three waveguides 131–134 handle the wavelengths $\lambda_1$, $\lambda_2$, $\lambda_3$, and $\lambda_4$, respectively. A wavelength channel $\lambda_1$ entering input line 1 (or input line 2) can be switched to either output line 1 (or output line 2) by controlling the relative phases (via phase shifters 140) between the three connecting waveguides for that channel. For example, channel 3 which connects via waveguides 133 to phase shifter unit 140 has its phase shift controlled by the phase shifter elements 3, 7, and 11 of phase shifter unit 140. Essentially, each wavelength channel has its own generalized Mach-Zehnder interferometer, consisting of the WGRs 110 and 120 and the connecting waveguides of arrays 130 and 130' for that channel.

Each of the 12 phase shifter elements of unit 140 are made to have a controllable phase shift which can be switched between a first value and a second value. The first phase value (e.g., typically about zero) enables the desired wavelength channel received from input line 1 at WGR 110 to be outputted at output line 1 of WGR 120. The second phase value (e.g., typically provides about 180° phase shift) enables the desired wavelength at a input line 1 at WGR 110 to be outputted at output line 2 of WGR 120.

Since the operation of the WDM unit 100 is symmetrical about the middle line 190, the operation of WGR 110, waveguide unit 130 and left-half of phase shifter 140 operates the same as the right-half of phase shifter 140, waveguide unit 130' and WGR 120. As a result, if the images of wavelength $\lambda_1$ of input line1 are made to look like images of wavelength $\lambda_1$ of input line 2, they are outputted by WGR 120 to output line 2. In this manner in a 2 line WDM 100, a wavelength channel from one input line can be switched to another output line and vice-versa. In a more general P line WDM implementation, where P=2, a wavelength channel $\lambda_1$ from line 1 can be switched to an adjacent line 2, a wavelength channel $\lambda_1$ from line 2 to line 3 etc. The wavelength channel $\lambda_1$ of the Pth line can be switched to line 1.

Obviously if a plurality of wavelengths $\lambda_i$ of input line 1 are to be switched from output line 1 to output line 2 then the corresponding phase shift elements in unit 140 associated with those plurality of wavelengths $\lambda_i$ must be switched to the second phase value.

The phase shifter elements in array 140 can be made controllable using a an electrical signal, optical signal, or temperature, e.g., 149, to control an optical index of refraction of the associated phase shifter element and thereby change the effective length of that phase shifter element.

The WDM cross-connect design of FIG. 1 can be expanded to the case of P lines×P lines by employing an interleave chirp in the WGRs 110 and 120 that creates P images in each $\Omega_i$ with enough connecting waveguides to collect all the images. The interleave chirp for values of P up to 8 is given in Table 1 shown in FIG. 14. The values on the right side of the table give the additional path length in terms of $\lambda_c$ to add to each arm, the series repeating itself until the last arm is reached. For example, for P=4 every fourth arm of the WGRs is given an additional path length of $\lambda_c/2$. By adjusting the phase shifter elements in the connecting waveguides, one can switch any channel in any line to any other line, in, however, a cyclical fashion. For example, for P=3, if one switches channel 1 in line 1 to line 2, then channel 1 in line 2 necessarily switches to line 3, and channel 1 in line 3 necessarily switches to line 1. One cannot exchange channels between lines without affecting that same channel in the other lines. If one requires this functionality, one can build it out of an array of P=2 devices using, for example, a well-known Banyan network [e.g., see the article by L. Goke and G. Lipovski, "Banyan Networks for partitioning multiprocessor systems," 1st Int. Symp. on Computer Arch., (1972)].

Switching via a phase shifter unit 170 having connecting waveguides of nominally equal lengths has three significant benefits. First, the dominant loss in WGRs is due to radiation outside of $\Omega_0$ as described in the previously-referenced article by C. Dragone, "Optimum design of a planar array of tapered waveguides," *J. Opt. Soc. Am. A,* vol. 7, pp. 2081–2091 (1990). The loss is especially high near the edges of $\Omega_0$; this portion of $\Omega_0$ is often even discarded, as discussed in the previously-referenced article by K. Okamoto et. al. In the interleave cross-connect, the addition of connections in $\Omega_{-1}$ and $\Omega_{+1}$ significantly reduces the losses.

Second, a well-known limitation of the two-arm Mach-Zehnder as a switch is sensitivity to the exact power splitting ratios of the two couplers. This, for example, limited the switching extinction ratio of the add/drop arrangement described in the Okamoto et. al. article, requiring a series of Mach-Zehnders in order to improve the extinction. However, by having three or more arms per wavelength channel in the interferometer, as in the interleave cross-connect of FIG. 1, one can always adjust the phases so as to have exactly zero power in one port provided that the sum of the powers in the arms with the lowest powers is greater than the power in the third. In other words, one can always form a triangle from three segments provided that the sum of the lengths of the shorter two segments is greater than the third. For connecting waveguides to Brillouin zones $\Omega_{-1}'$, $\Omega_0'$, and $\Omega_{+1}'$, this is generally the case. A similar argument holds for the case of more than three arms. Thus even if there are fabrication imperfections, the phase shifters can be adjusted to correct for them. This tolerance is especially useful for designs in media with small waveguide dimensions, such as Indium Phosphide (InP). It should be noted that the WDM cross-connect may also be implemented as part of a silica integrated circuit.

Figure 8:
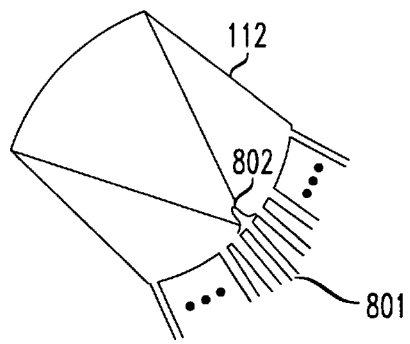
FIG. 8 shows the free space region of a star coupler having one waveguide for coupling each wavelength image to the phase shifter unit.

Third, in the proposed device, one can use multiple connecting waveguides in each $\Omega_i'$ for each wavelength channel. With reference to FIG. 8 there is shown an arrangement wherein only one waveguide 801 is used to connect to each wavelength channel image 802 in each $\Omega_i'$ from coupler 112.

Figure 9A:
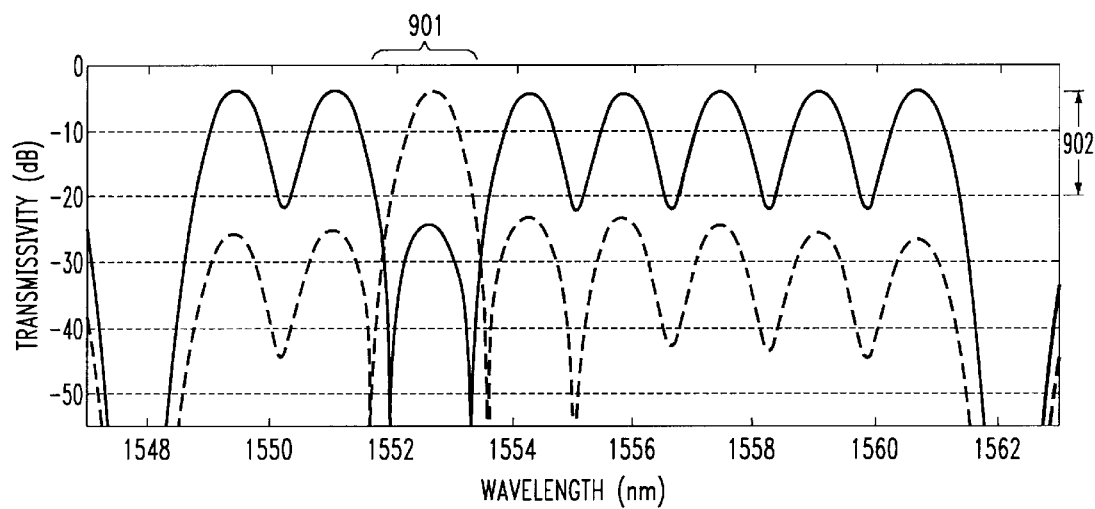
FIGS. 9(a) and 9(b) show the transmissivity of different embodiments of the arrangement of FIG. 8.
Figure 9B:
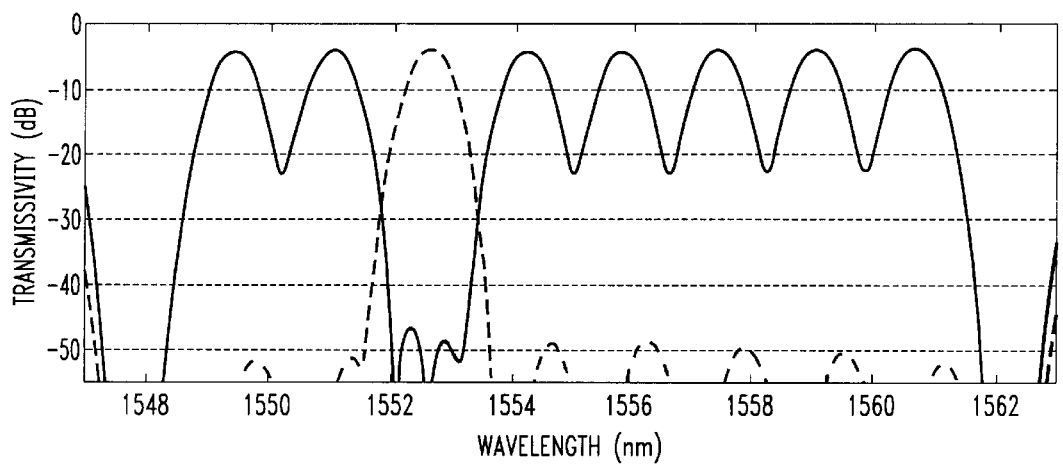

FIG. 9 shows for the arrangement of FIG. 8, the illustrative transmissivity from input line 1 to output line 1 (solid line) and input line 1 to output line 2 (dashed line) of the WDM interleave cross-connect 100 of FIG. 1. In FIG. 9(a) all connecting waveguide path lengths are equal, except for channel 3, see 901, which has a length long enough to produce the required extra 90° phase shift. In FIG. 9(b) the channel 3 connecting path length is adjusted to achieve best switching extinction ratio. As one can see, the switching extinction ratio in FIG. 9(a) is only ~20 dB. Thus the optimum switching extinction ratio does not occur when the connecting waveguides have exactly the same path length, which is because there is non-negligible power lost to $\Omega_{-2}'$, and $\Omega_{+2}'$.

FIG. 9(b) shows that for the best switching extinction ratio, the length of the channel 3 waveguide needs to be somewhat more or less than the length needed for an extra 90° phase shift. In FIG. 9(b), the phase shifters for the images from $\Omega_0'$, $\Omega_{+1}'$, and $\Omega_1'$ have been adjusted to maximize the switching extinction ratio (i.e., a triangle made of the phasors in the three arms was formed). The extinction ratio is limited by the sidelobes of the WGR response.

Figure 10:
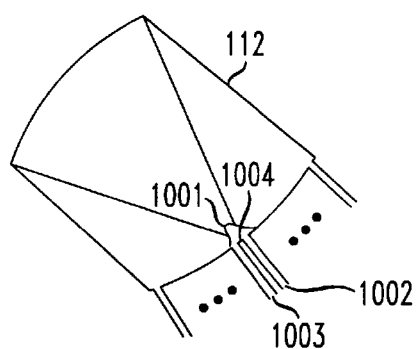
FIG. 10 shows the free space region of a star coupler having two waveguides for coupling each wavelength image to the phase shifter unit.

With reference to FIG. 10 there is shown an arrangement where two waveguides 1002 and 1003 are used to connect to each wavelength channel image 1001 in each $\Omega_i'$ from coupler 112. The widths of the connecting waveguides 1002 and 1003 are narrowed along with the spacing between them in order to enhance their mutual coupling to each $\Omega_i'$ image. Thus, assuming that only the Brillouin zones $\Omega_1'$, $\Omega_0'$, and $\Omega_{+1}'$ are used for each wavelength, then each of the waveguide grouping 131–134 would contain 6 waveguides (two for each image in $\Omega_1'$, $\Omega_0'$, and $\Omega_{+1}'$). As shown in FIG. 10, while the image 1001 is focused on the region 1004 between the waveguides 1002 and 1003, a portion of the image is still coupled to the waveguides 1002 and 1003.

Figure 11A:
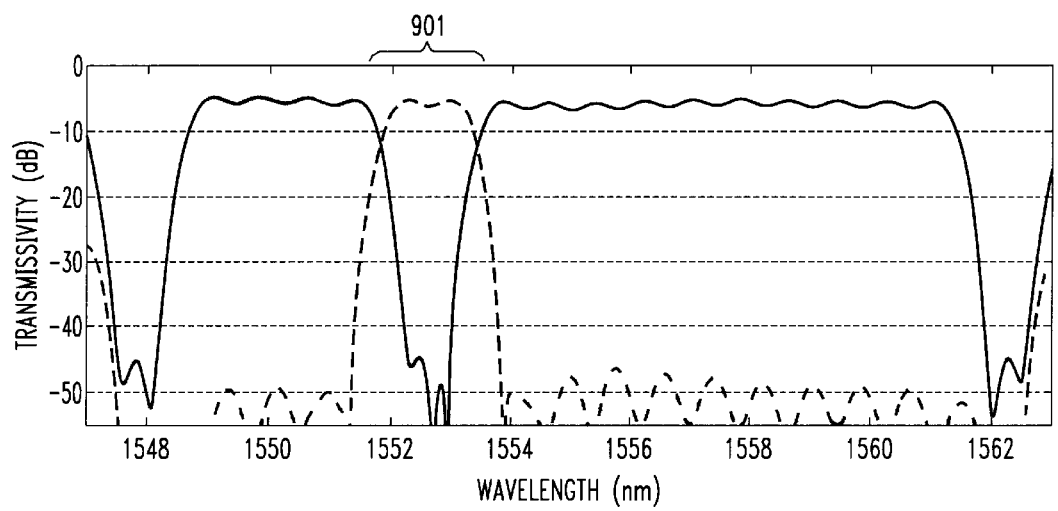
FIG. 11(a) and 11(b) show the transmissivity of different embodiments of the arrangement of FIG. 10.
Figure 11B:
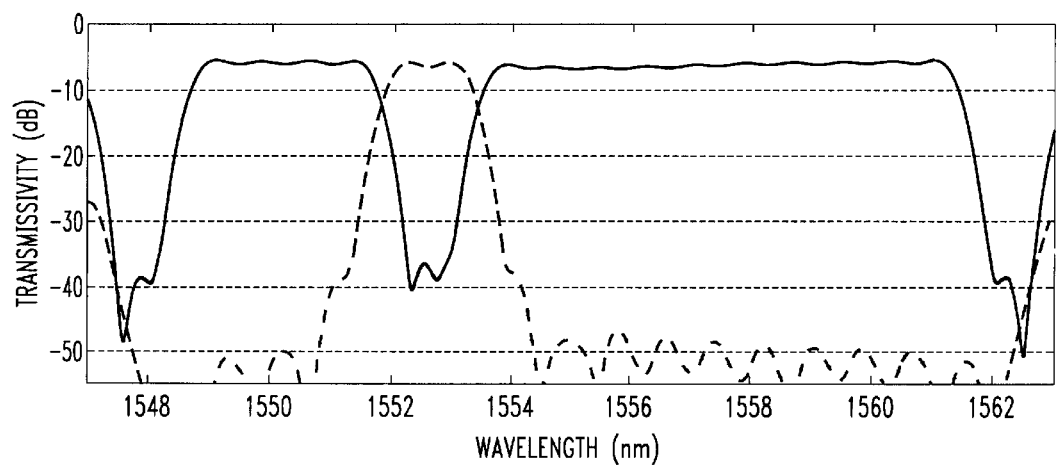

FIG. 11(a) shows, for the arrangement of FIG. 10, the illustrative transmissivity from input line 1 to output line 1 (solid line) and input line 1 to output line 2 (dashed line) of the WDM interleave cross-connect 100 of FIG. 1. In FIG. 11(b) an additional defocusing chirp is added to both the WGRs, 113 and 123, in order to increase the flatness at the tops of the passbands.

Figure 12:
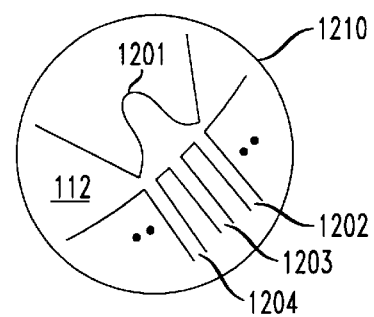
FIG. 12 shows the free space region of a star coupler having three waveguides for coupling each wavelength image to the phase shifter unit.

With reference to FIG. 12 there is shown a close-up of a region 1210 of coupler 112 of WGR 110 of FIG. 1. As shown, this arrangement uses three waveguides 1202, 1203 and 1204 to connect to each wavelength channel image 1201 in each $\Omega_i'$ from coupler 112. Again the widths of the connecting waveguides 1202–1204 are narrowed along with the spacing between them in order to enhance their mutual coupling to each $\Omega_i'$ from coupler 112. It should be noted that both the widths and spacings of the waveguides 1202–1204 of FIG. 12 are less than the widths and spacings of the waveguides 1002–1003 of FIG. 10.

Returning to FIG. 12, assuming that only the Brillouin zones $\Omega_{-1}'$, $\Omega_0'$, and $\Omega_{+1}'$ are used, we connect waveguides to $\Omega_{-1}'$, $\Omega_0'$, and $\Omega_1'$, resulting in three connecting waveguides per wavelength channel. Then each of the waveguide grouping 131–134 of FIG. 1 would contain 9 waveguides (three for each $\Omega_{-1}'$, $\Omega_0'$, and $\Omega_{+1}'$). While the image 1201 is focused on the waveguide 1203, a portion of the image is still coupled to the waveguides 1202 and 1204. While not illustrated, the transmissivity from input line 1 to output line 1 and input line 1 to output line 2 of the arrangement of FIG. 12 would be similar to that shown in FIGS. 11a and 11b, but have a somewhat more rectangular passband that has a higher extinction ratio.

Thus by careful design, the coupling between the star-coupler 112 and the one or more waveguides of array 130 used for each channel may be a rectangular passband with very low excess loss as described in the previously-referenced U.S. Pat. No. 5,488,680. If necessary, residual passband ripple, e.g., 902 of FIG. 9, can be smoothed out by moving the port waveguides out of focus, which can be done either physically or by chirping the WGRs with the function $\epsilon[m-(M+1)/2]^2$ added to the arm length distribution, where $\epsilon$ is a small number with units of length giving some additional loss. Such an approach is described in the article by C. R. Doerr, M. Shirasaki, and C. H. Joyner, "Chromatic focal plane displacement in the parabolic chirped waveguide grating router," *IEEE Photon. Technol. Lett.*, vol. 9, pp. 625–627 (1997). To minimize the number of phase shifter contacts, each waveguide group can be placed under a single contact.

Finally, a design with integrated connecting waveguides prevents the random performance fading due to multipath interference that can occur in large networks containing back-to-back multiplexers connected by fibers, as described in the article by E. L. Goldstein and L. Eskildsen, Scaling limitations in transparent optical networks due to low-level crosstalk, *IEEE Photon. Technol. Lett.*, vol. 7., pp. 93–94 (1995).

Figure 13:
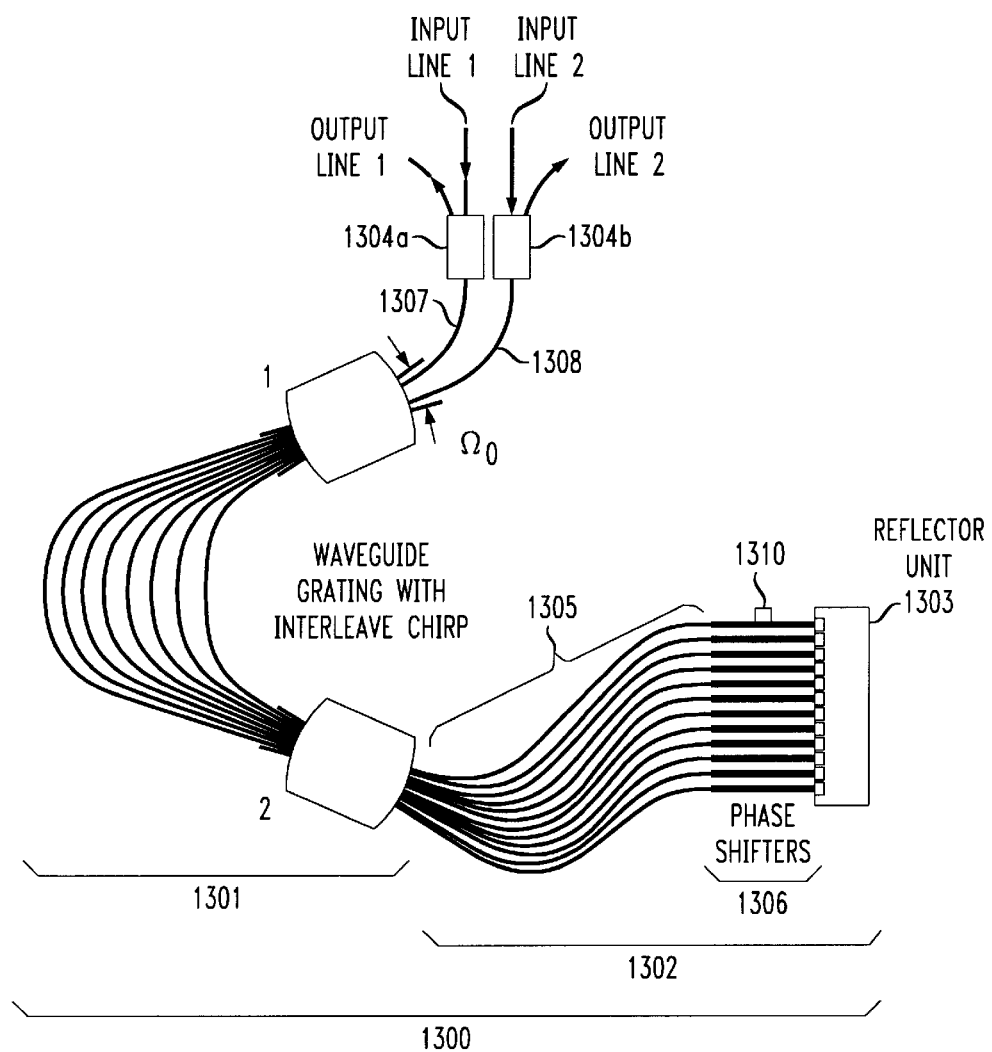
FIG. 13 shows an illustrative diagram of a reconfigureable WDM cross-connect comprising a "interleave-chirped" WGR, a phase shifter unit, a reflector unit, and couplers.

Shown in FIG. 13 is an illustrative diagram of a reconfigureable wavelength-division-multiplexing (WDM) cross-connect 1300 comprising an "interleave-chirped" waveguide grating router (WGRs) 1301, a phase shifter unit 1302, and a reflector unit 1303 and couplers 1304a and 1304b. Since the WDM cross-connect 100 is symmetric about the axis 190, the WDM cross-connect 1300 may be formed by cutting WGR 110 in half, at axis 190, and placing a reflector unit at the axis 190 location. The resulting WDM cross-connect 1300 includes the left-half of FIG. 1 including WGR 110, the waveguide array 130 and the left-half of phase shifter array 140, i.e., up to line 190. The operation of the WGR 1301 is the same as that of WGR 130. The operation of phase shifter unit 1302 is the same as that of the left-half of waveguide array 130 and phase shifters 140. Thus, the phase shift provided by phase shifters 1306 is only one-half of that provided by phase shifters 140 of FIG. 1.

The signals from input lines 1 and 2 are coupled via couplers 1304 to WGR 1301. After the wavelength images are demultiplexed and processed by WGR 1301 and pass through the waveguides 1305 and phase shifters 1306 they are reflected by reflector unit 1303. After reflection, the wavelength images obtain another phase shift from phase shifter 1306 (the two phase shifts of phase shifters 1306 equals the phase shift of phase shifters 140). The wavelength images then pass through waveguides 1305, are multiplexed by WGR 1301, outputted at either port 1306 or 1307, and then coupled via the appropriate coupler unit 1304a or 1304b to output line 1 or 2, respectively. If the phase shift of phase shifters 1306 are set at a first value ( about zero) for one or more wavelengths of a signal from input line 1 (input line 2) these one or more wavelengths are outputted on output line 1 (output line 2), while if the phase shift of phase shifters 1306 are set at a second value (about 90°) for one or more wavelengths then these one or more wavelengths are outputted on output line 2 (output line 1). Note that since the images pass twice through phase shifters 1306, phase shifters need only be shifted by one half the amount that is needed by phase shifters 140. Again the phase shift of phase shifters 1306 are controlled by electrical or optical signals 1310 to each of the phase shifters 1306.

Figures 14, 15:
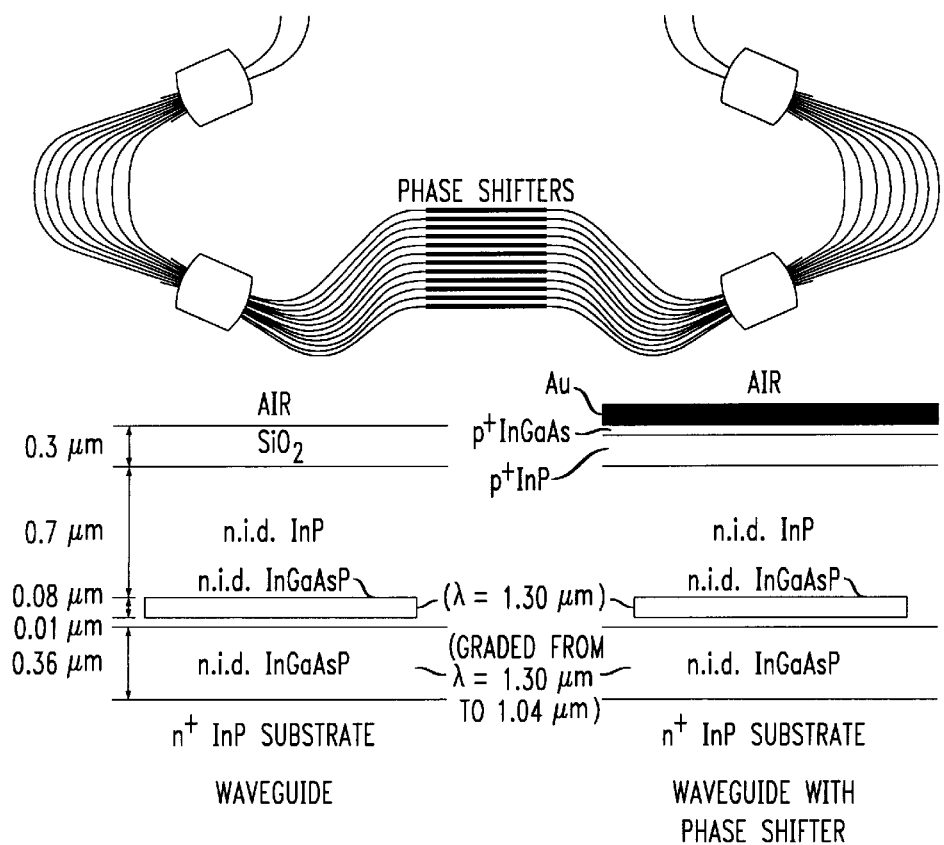
FIG. 14 shows a table illustrating the grating arm changes to apply to WGRs when the number of lines P varies from 2 through 8.
FIG. 15 shows an illustrative implementation of a waveguide and a waveguide with phase shifter.

FIG. 15 shows an illustrative implementation of a waveguide and a waveguide with phase shifter. More particularly, FIG. 15 shows a 2 line×2 line, 6-channel×200 GHz spacing cross connect in InP. $M_1=M_2=30$, and the WGRs have free-spectral-ranges of 7×200 GHz. The connecting waveguides are connected to $\Omega_{-1}'$, $\Omega_0'$, and $\Omega_1'$ for each channel ($\Omega_i'$ are the Brillouin zones of the star couplers in the WGRs[4]), resulting in a total of 3×6=18 connecting waveguides. To account for any relative wavelength shift between the two WGRs, several ports were included at each line connection. The waveguides have a normalized transverse index step of 0.85%, and the bend radius is 620 $\mu$m. The dimensions of the entire device is about 4.2×9.5 mm$^2$.

The waveguide structure is a buried rib as shown in FIG. 15. First, the slab and rib were grown, then the waveguides were wet-etched into the rib. Undoped InP was grown on top. Then a protective layer of $SiO_2$ over the waveguides and between the phase shifters ($SiO_2$ width of 33 $\mu$m) was applied. Then a p-doped layer was grown over the phase shifters, and finally gold contacts (52 $\mu$m wide) were deposited on the phase shifters. The phase shifters are 1.4 mm long, spaced by 85 $\mu$m, and aligned to the (110) direction.

Figure 16:
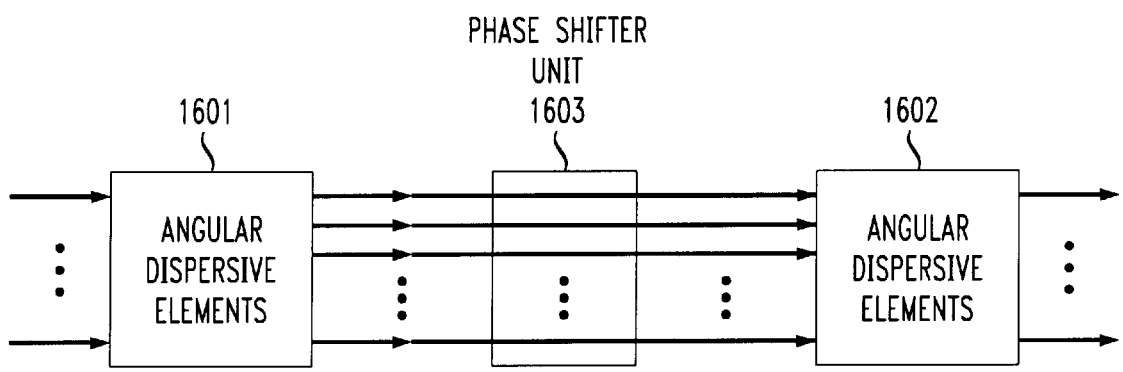
FIG. 16 shows a more generalized illustrative diagram of a reconfigureable WDM cross-connect comprising two groups of angular dispersive elements connected by a phase shifter unit.

While the present invention has been described in FIG. 1 as using WGR e.g., 110 and 120, it should be understood that the units 110 and 120 may be implemented using other types of angular dispersive elements. FIG. 16 shows a more generalized illustrative diagram of a reconfigureable wavelength-division-multiplexing (WDM) cross-connect of the type shown in FIG. 1 which is implemented using two groups of angular dispersive elements 1601 and 1602 connected by a phase shifter unit 1603. The angular dispersive elements 1601 and 1602 may be implemented using a virtually imaged phase array (VIPA) as described in the article by M. Shirasaki entitled "Large angular dispersion by a virtually imaged phase array and its application to a wavelength demultiplexer", OPTICS LETTERS, Vol. 21, No. 5, March 1996. Another type of angular dispersive element which may be used is a well-known reflecting grating. It should be noted that the phase shifter 1603 of FIG. 16, as well as the phase shifter unit 140 of FIG. 1, may be implemented in a well-known manner using free space optics.

Figure 17:
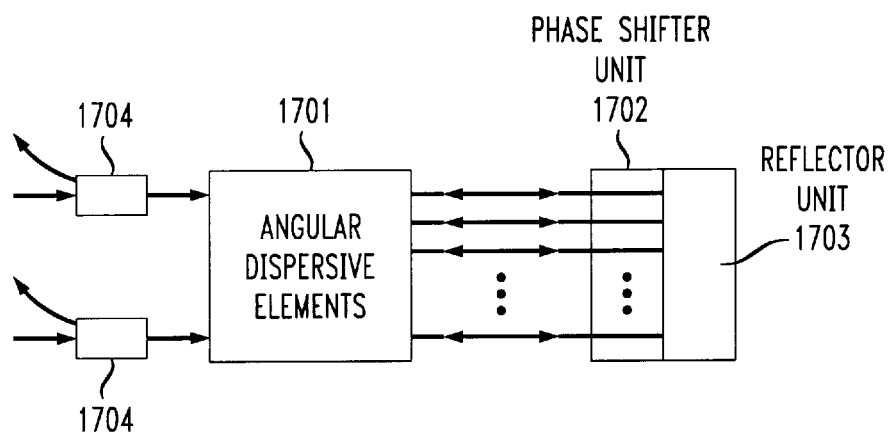
FIG. 17 shows an illustrative diagram of a reconfigureable WDM cross-connect comprising an angular dispersive elements unit, a phase shifter unit, a reflector unit, and couplers.

It should also be noted that because of the symmetry of FIG. 16, a reflector unit may be used to replace the right half of FIG. 16, in the same manner as shown and described in FIG. 13. FIG. 17 shows such an arrangement of a reconfigureable WDM cross-connect comprising an angular dispersive elements unit 1701, a phase shifter unit 1702, a reflector unit 1703, and couplers 1704. The WDM cross-connect of FIG. 17 operates in essentially the same manner as the WDM cross-connect previously discussed for FIG. 13. Signals inputted at couplers 1704 enter one or more selected ports of the angular dispersive elements unit 1701 and phase shifter unit 1702 and are reflected back through the phase shifter unit 1703 and angular dispersive elements unit 1701 and, with the appropriate value set in particular phase shifter(s) of phase shifter unit 1703, the reflected signals may be outputted from one or more selected ports of the angular dispersive elements unit 1601 to an output line via couplers 1704.

Thus, what has been described is merely illustrative of the application of the principles of the present invention. Other arrangements and methods can be implemented by those skilled in the art without departing from the spirit and scope of the present invention.

It is claimed:

1. A Wavelength Division Multiplexing (WDM) cross-connect comprising
   a first unit comprising 2 or more angular dispersive elements that have a non-zero phase shift between them that couple somewhat equally to one or more input ports,
   a second unit comprising 2 or more angular dispersive elements that have a non-zero phase shift between them that couple somewhat equally to one or more output ports, and
   a phase shifter unit that carries the images from the dispersive elements of the first unit to the images of the same frequency from the dispersive elements of the second unit and can control the relative phases between the images for the purpose of directing signals from selected input ports in the first unit to selected output ports in the second unit.

2. The WDM cross-connect of claim 1 wherein the angular dispersive units are waveguide gratings.

3. The WDM cross-connect of claim 2 wherein the waveguide gratings in each angular dispersive unit are interleaved.

4. The WDM cross-connect of claim 1 wherein the phase shifter unit is a series of waveguide paths with phase shifters in the waveguide paths.

5. A Wavelength Division Multiplexing (WDM) cross-connect comprising
   a first waveguide grating router, a second waveguide grating router, and a phase shifter unit;
   said first waveguide grating router including
   a first coupler having at least two input ports, each input port receiving a different optical signal channel including one or more optical wavelengths, and a first plurality of output ports;
   an interconnect unit including a first plurality of interleaved chirped waveguide paths for interconnecting said first plurality output ports of said first coupler to a first plurality of input ports of a second coupler; and
   said second coupler also having a second plurality of output ports for outputting multiple images of any optical wavelength from said first waveguide grating router;

said second waveguide grating router including
a first coupler having said second plurality of input ports for receiving the multiple images of any optical wavelength outputted from the second coupler and said first plurality of output ports;
an interconnect unit including said first plurality of interleaved chirped waveguide paths for interconnecting said first plurality output ports of said first coupler to a first plurality of input ports of a second coupler; and
said second coupler also having at least two output ports, each output port outputting an optical signal channel including one or more optical wavelengths; and
said phase shifter unit including said second plurality of phase shifter waveguides for interconnecting to said second plurality of output ports of said second coupler of said first waveguide grating router to said second plurality of input ports of said first coupler of said second waveguide grating router, each phase shifter waveguide providing a predetermined phase shift to an optical wavelength passing therethrough.

6. The WDM cross-connect of claim 5 wherein the predetermined phase shift of a group of said second plurality of phase shifter waveguides are switchable between a two or more values.

7. The WDM cross-connect of claim 5 wherein at least one phase shifter waveguide is controlled by an electrical signal applied thereto.

8. The WDM cross-connect of claim 5 wherein when the predetermined phase shift of a group of said second plurality of phase shifter waveguides is at a first value a wavelength received at a first input port of said first coupler is coupled to a first output port of said second coupler.

9. The WDM cross-connect of claim 5 wherein when the predetermined phase shift of a group of said second plurality of phase shifter waveguides is at a second value a wavelength received at a first input port of said first coupler is outputted to a second port of said second coupler.

10. The WDM cross-connect of claim 5 wherein said first coupler includes two input ports and said second coupler includes two output ports and wherein the differential path length of adjacent ones of said first plurality of interleaved chirped waveguide paths is a quarter wavelength at a predetermined wavelength.

11. The WDM cross-connect of claim 5 wherein said first coupler includes P input ports, P>1, and said second coupler includes P output ports and wherein the differential path length of consecutive paths of said first plurality of interleaved chirped waveguide paths cycle through the differential path lengths as shown below

| P | Arm path length change series [$\lambda_c$] |
|---|---|
| 2 | 1/4,0 |
| 3 | 1/3,0,0 |
| 4 | 1/2,0,0,0 |
| 5 | 1/5,3/5,1/5,0,0 |
| 6 | 3/4,1/3,3/4,0,1/12,0 |
| 7 | 1/7,3/7,6/7,3/7,1/7,0,0 |
| 8 | 1/4,1/2,0,1/2,1/4,0,0,0 | where $\lambda_c$ is the wavelength of interest in the waveguide.

12. The WDM cross-connect of claim 5 wherein each of the multiple images from said first waveguide grating router is focused on one of said second plurality of phase shifter waveguides.

13. The WDM cross-connect of claim 5 wherein one or more of the multiple images from said first waveguide grating router is focused on two of said second plurality of phase shifter waveguides.

14. The WDM cross-connect of claim 5 wherein each of the multiple images from said first waveguide grating router is focused on three adjacent phase shifter waveguides of said second plurality of phase shifter waveguides.

15. The WDM cross-connect of claim 5 being implemented as part of an indium phosphide optical integrated circuit.

16. The WDM cross-connect of claim 5 being implemented as part of a silica integrated circuit.

17. The WDM cross-connect of claim 5 wherein the second coupler outputs three images of any wavelength signal received at said at least two input ports.

18. The WDM cross-connect of claim 5 wherein the number of input and output ports is at least three and wherein when a predetermined wavelength received at a first input port is switched to a second output port, said predetermined wavelength received at a second input port is switched to a third output port.

19. A Wavelength Division Multiplexer (WDM) cross-connect comprising
a waveguide grating router, a phase shifter unit and a reflector unit;
said waveguide grating router including
a first coupler having at least two input ports, each input port receiving a different optical signal channel including one or more optical wavelengths, and a first plurality of output ports;
an interconnect unit including a plurality of interleaved chirped waveguide paths for interconnecting said first plurality output ports of said first coupler to a first plurality of input ports of a second coupler, the interleaved chirped waveguide paths having a chirping function chosen for the purpose of creating two or more images of each wavelength passband in said second coupler; and
said second coupler also having at least two output ports, each output port outputting an optical signal channel including one or more optical wavelengths:
said phase shifter unit including a second plurality of phase shifter waveguides for interconnecting said second plurality of output ports of said waveguide grating router to a plurality of reflectors of a reflector unit, each phase shifter waveguide providing a predetermined phase shift to one or more optical wavelengths passing therethrough and reflected by said reflector unit; and
said reflector unit reflecting the one or more optical wavelengths back through said phase shifter unit and said waveguide grating router.

20. The WDM cross-connect of claim 19 further including an input/output coupler unit connected to the first coupler of said waveguide grating router for inputting optical signals to and outputting optical signals from said waveguide grating router.

21. The WDM cross-connect of claim 19 wherein the predetermined phase shift of a group of said plurality of phase shifter waveguides are switchable between a two or more values.

22. The WDM cross-connect of claim 19 wherein at least one phase shifter waveguide is controlled by an electrical signal applied thereto.

23. The WDM cross-connect of claim 19 wherein when the predetermined phase shift of a group of said plurality of phase shifter waveguides is at a first value a wavelength received at a first input port of said first coupler is coupled to a first output port of said second coupler.

24. The WDM cross-connect of claim 19 wherein when the predetermined phase shift of a group of said plurality of phase shifter waveguides is at a second value a wavelength received at a first input port of said first coupler is outputted to a second port of said second coupler.

25. The WDM cross-connect of claim 19 wherein said first coupler includes two input ports and said second coupler includes two output ports and wherein the differential path length of adjacent ones of said plurality of interleaved chirped waveguide paths is a quarter wavelength at a predetermined wavelength.

26. The WDM cross-connect of claim 19 wherein said first coupler includes P input ports, P>1, and said second coupler includes P output ports and wherein the differential path length of consecutive paths of said plurality of interleaved chirped waveguide paths cycle through the differential path lengths specified in Table 1.

27. The WDM cross-connect of claim 19 wherein each of the multiple images from said first waveguide grating router is focused on one of said plurality of phase shifter waveguides.

28. The WDM cross-connect of claim 19 wherein one or more of the multiple images from said first waveguide grating router is focused on two of said plurality of phase shifter waveguides.

29. The WDM cross-connect of claim 19 wherein each of the multiple images from said first waveguide grating router is focused on three adjacent phase shifter waveguides of said plurality of phase shifter waveguides.

30. The WDM cross-connect of claim 19 being implemented as part of an indium phosphide optical integrated circuit.

31. The WDM cross-connect of claim 19 wherein the second coupler outputs three images of any wavelength signal received at said at least two input ports.

32. The WDM cross-connect of claim 19 wherein the number of input and output ports is at least three and wherein when a predetermined wavelength received at a first input port is switched to a second output port, said predetermined wavelength received at a second input port is switched to a third output port.

33. A Wavelength Division Multiplexing (WDM) cross-connect comprising an angular dispersive unit comprising 2 or more angular dispersive elements that have a non-zero phase shift value between them that couple somewhat equally to one or more ports, the phase shift value chosen for the purpose of creating two or more images of each wavelength passband, a reflector unit reflecting the one or more optical wavelengths back through said phase shifter unit and the dispersive elements of the angular dispersive unit, and a phase shifter unit that carries the images from the dispersive elements of the angular dispersive unit to the reflector unit and carries the reflected images from the reflector unit back to the dispersive elements of the angular dispersive unit, the phase shifter unit controlling the relative phases between the images for the purpose of directing signals inputted at one or more selected ports in the angular dispersive unit through the WDM cross-connect to be outputted at one or more selected ports of the angular dispersive unit.

34. The WDM cross-connect of claim 33 wherein the angular dispersive units are waveguide gratings.

35. The WDM cross-connect of claim 33 wherein the waveguide gratings in the angular dispersive unit are interleaved.

36. The WDM cross-connect of claim 33 wherein the phase shifter unit is a series of waveguide paths with phase shifters in the waveguide paths.

* * * * *